(12) United States Patent
Bhandarkar et al.

(10) Patent No.: US 10,091,003 B2
(45) Date of Patent: Oct. 2, 2018

(54) MOBILE SIGNATURE EMBEDDED IN DESKTOP WORKFLOW

(71) Applicant: ADOBE SYSTEMS INCORPORATED, San Jose, CA (US)

(72) Inventors: Mangesh Bhandarkar, Los Altos, CA (US); Frederic Thevenet, San Francisco, CA (US); David Rudi Sherry, San Jose, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 225 days.

(21) Appl. No.: 15/074,605

(22) Filed: Mar. 18, 2016

(65) Prior Publication Data

US 2017/0272249 A1    Sep. 21, 2017

(51) Int. Cl.
*H04L 9/32* (2006.01)
*G06F 21/64* (2013.01)

(52) U.S. Cl.
CPC ............ *H04L 9/3231* (2013.01); *G06F 21/64* (2013.01); *H04L 9/3247* (2013.01); *H04L 2209/608* (2013.01); *H04L 2209/68* (2013.01)

(58) Field of Classification Search
CPC ................. H04L 9/3231; H04L 9/3247; H04L 2209/608; H04L 2209/68; G06F 21/64
See application file for complete search history.

(56) References Cited

U.S. PATENT DOCUMENTS

| 7,296,161 | B1 * | 11/2007 | Wakao | ................. | H04N 19/60 |
| | | | | | 375/E7.226 |
| 9,059,858 | B1 * | 6/2015 | Giardina | ............... | H04L 9/3226 |
| 9,369,287 | B1 * | 6/2016 | Sarvestani | ........... | G06F 21/608 |
| 9,722,790 | B2 * | 8/2017 | Ebrahimi | .............. | H04L 9/3066 |
| 9,876,646 | B2 * | 1/2018 | Ebrahimi | .............. | H04L 9/3265 |
| 9,935,777 | B2 * | 4/2018 | Saxena | ................ | H04L 9/3247 |
| 9,942,396 | B2 * | 4/2018 | Follis | ................... | H04M 3/493 |
| 2006/0098900 | A1 * | 5/2006 | King | .................... | G06F 21/606 |
| | | | | | 382/305 |
| 2007/0094333 | A1 * | 4/2007 | C. Schilling | ......... | H04N 21/235 |
| | | | | | 709/206 |

(Continued)

*Primary Examiner* — Yonas A Bayou
(74) *Attorney, Agent, or Firm* — Shook, Hardy & Bacon L.L.P.

(57) ABSTRACT

Systems and methods provide for efficiently obtaining biometric signatures for electronically signing digital documents. A digital document having a signature field is provided for display on a general computing device. An instruction to obtain a biometric signature from a mobile computing device is received on the general computing device. A remote signing request is sent to a remote server device. The request can include, among other things, an electronic contact address associated with the mobile computing device. Responsive to receiving the request, a Uniform Resource Identifier (URI) is generated, referencing a dynamic application for obtaining the biometric signature on the mobile computing device. The remote server device obtains the biometric signature via the dynamic application or an incoming electronic message from the mobile computing device via the electronic contact address. The biometric signature is communicated to the client device for association with the signature field of the digital document.

35 Claims, 10 Drawing Sheets

(56) References Cited

U.S. PATENT DOCUMENTS

| | | | | |
|---|---|---|---|---|
| 2007/0256137 A1* | 11/2007 | Tame | ............... | G07B 1/00 |
| | | | | 726/26 |
| 2010/0011424 A1* | 1/2010 | Ushiku | ............... | G06F 21/32 |
| | | | | 726/5 |
| 2010/0125670 A1* | 5/2010 | Dondeti | ............... | H04L 67/104 |
| | | | | 709/229 |
| 2013/0110728 A1* | 5/2013 | Kobres | ............... | G06Q 30/06 |
| | | | | 705/75 |

* cited by examiner

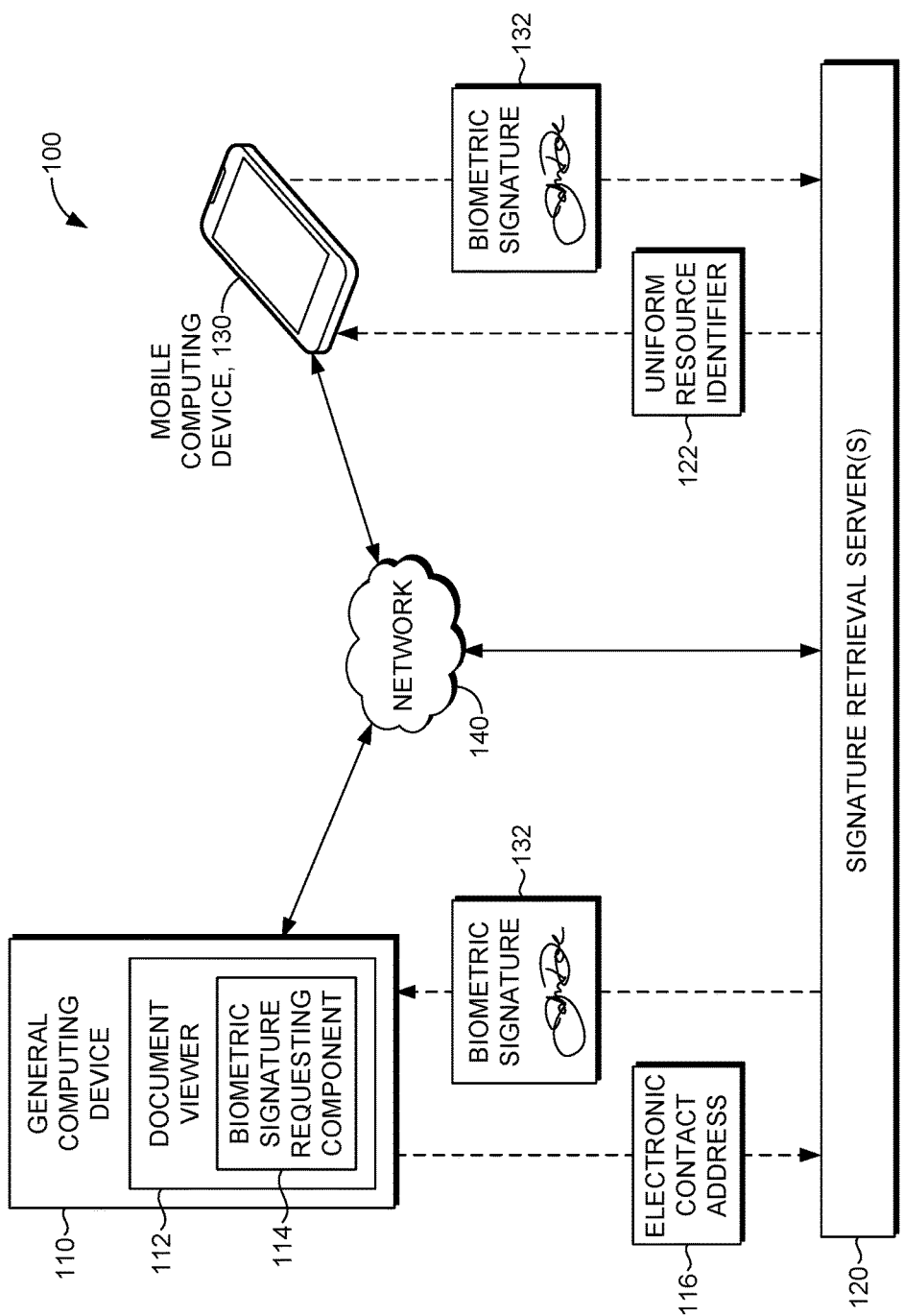

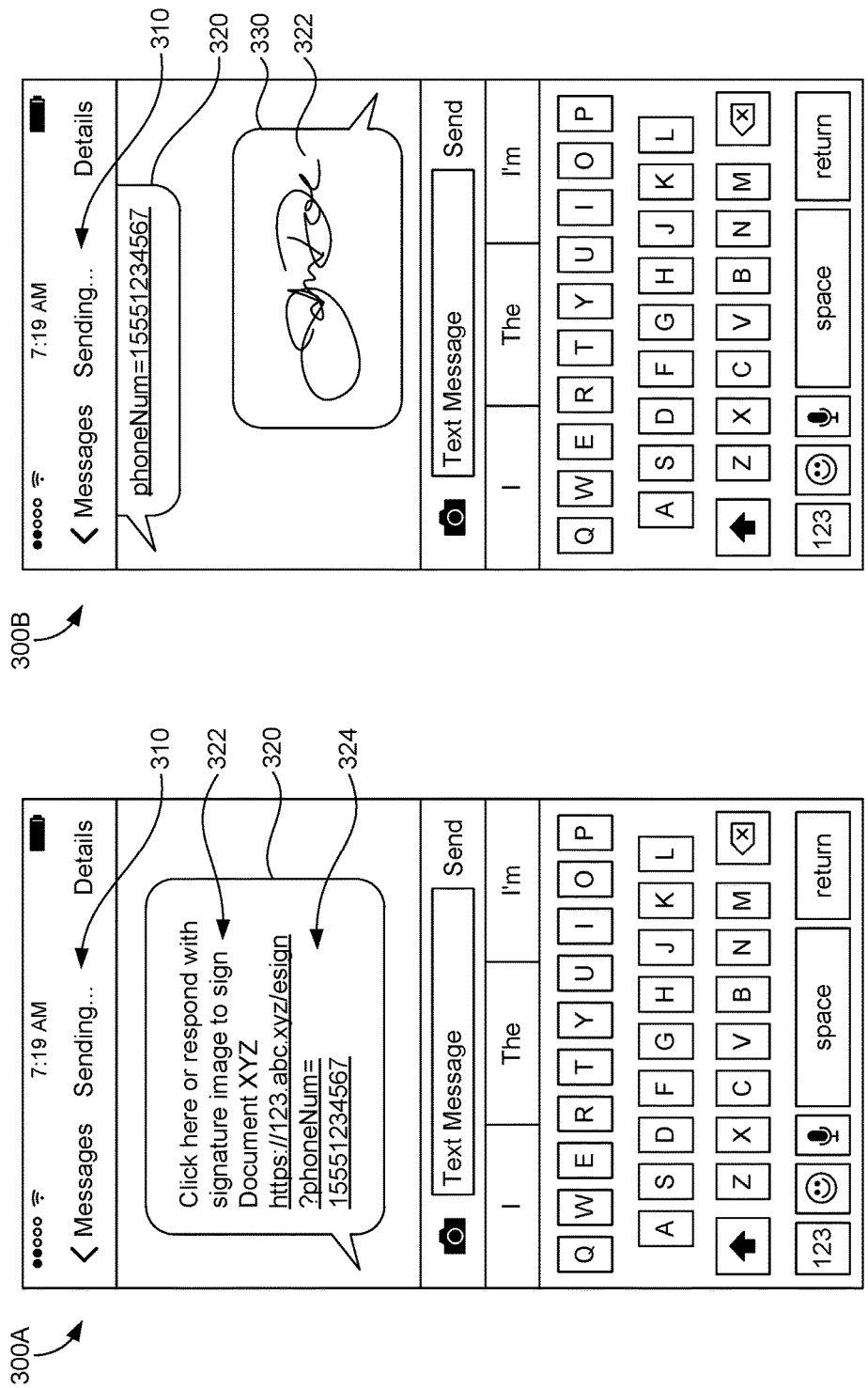

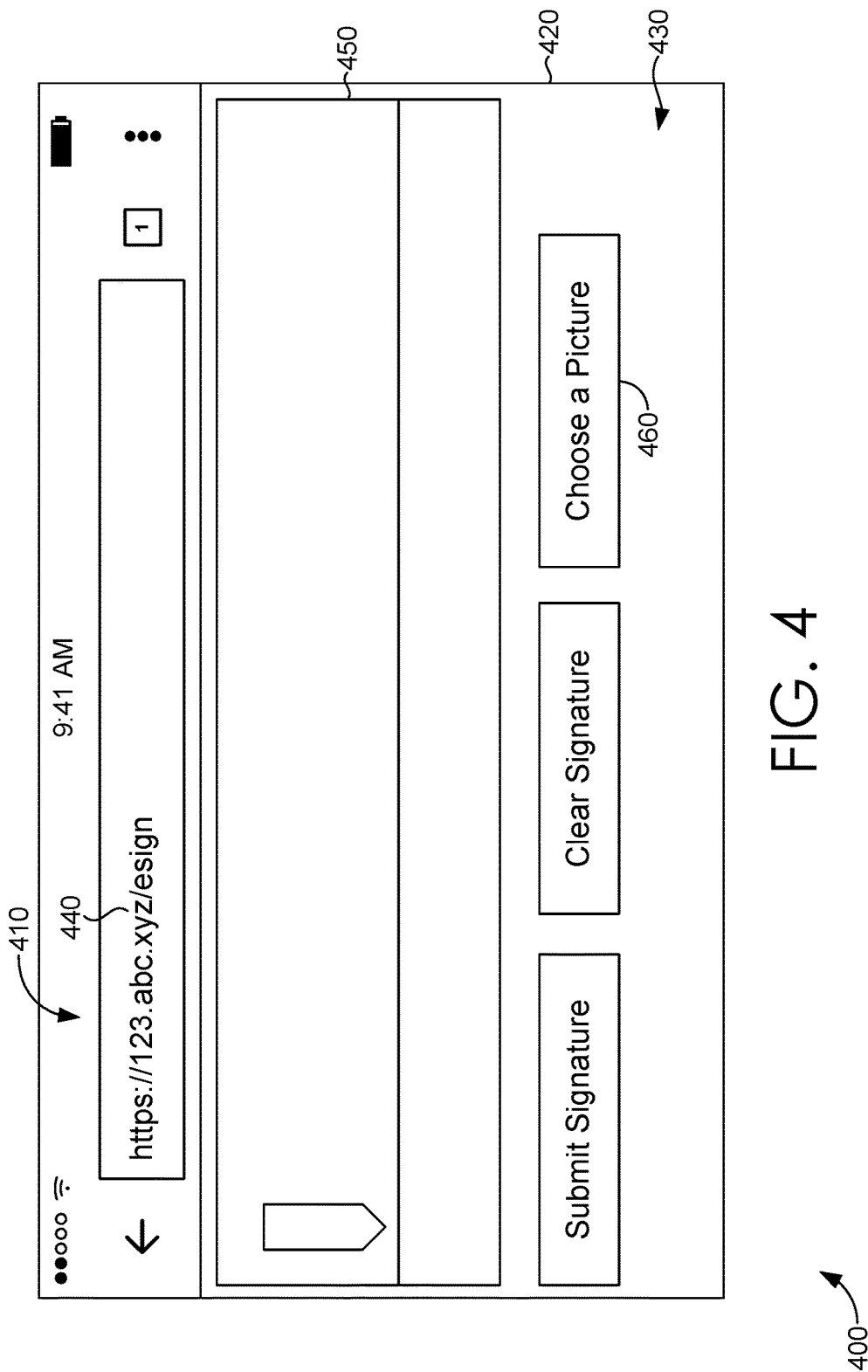

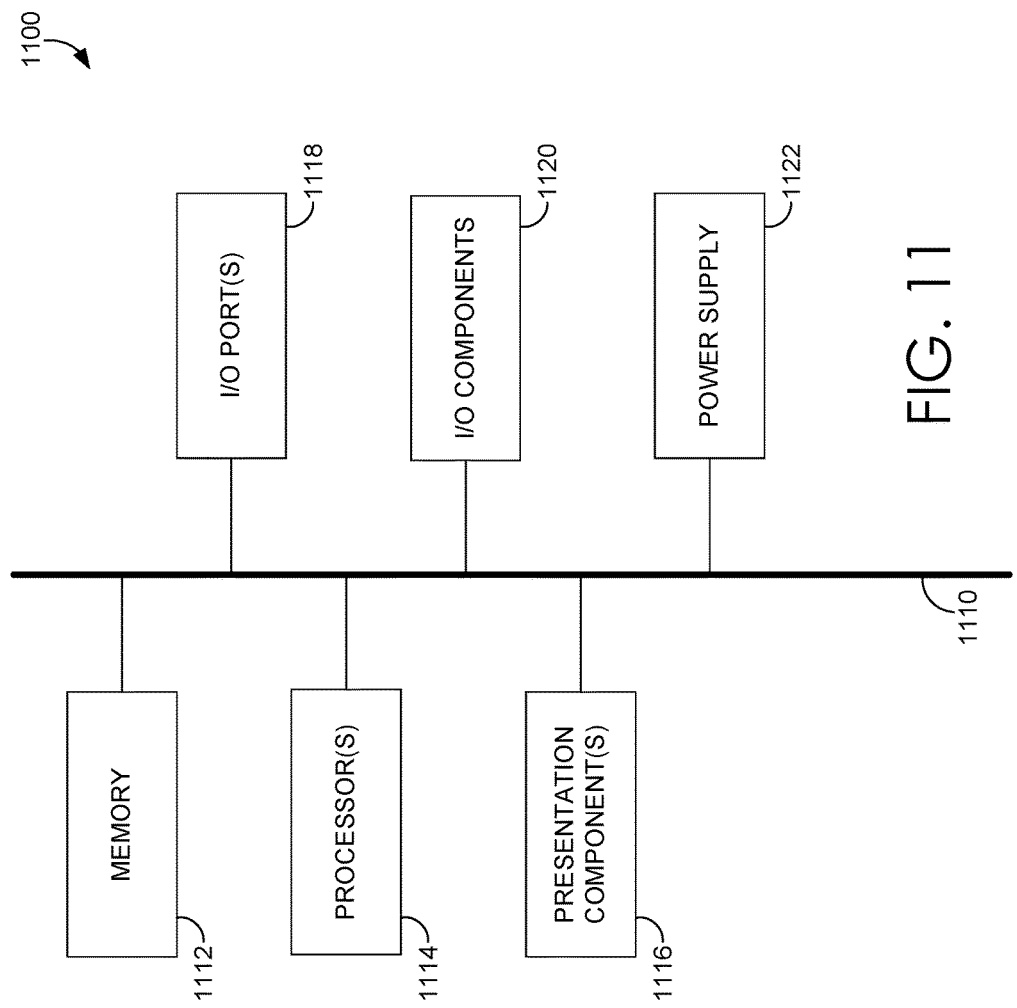

MOBILE SIGNATURE EMBEDDED IN DESKTOP WORKFLOW

BACKGROUND

With an increasing popularity in the production and exchange of electronic documents over paper documents, it is becoming commonplace for individuals to electronically sign formal documents (e.g., letters, contracts, etc.) that are embodied as digital documents. Currently, some desktop applications for handling digital documents, such as Adobe® Acrobat®, include tools for electronically signing digital documents. For instance, a signatory of a digital document can electronically sign a digital document by manually typing, on a keyboard, their name into the signature field. In such cases, the signatory can choose a stylistic font to emulate penmanship for association with their electronic signature. In another instance, the signatory can electronically sign the signature field of the digital document by roughly drawing, typically with a mouse, a vector image of their signature. While such tools are helpful to facilitating the workflow of electronically signing digital documents on general computing devices, they do not provide an accurate depiction of the signatory's biometric signature.

SUMMARY

Embodiments of the present invention relate to, among other things, obtaining biometric signatures for electronically signing digital documents. A digital document having a signature field is provided for display on a general computing device. An instruction to obtain a biometric signature from a mobile computing device, to electronically sign the signature field of the digital document on the general computing device, is received. A request to obtain the electronic signature from the mobile computing device is sent from the general computing device to a remote server device. The remote server device generates a Uniform Resource Identifier (URI) for a dynamic application that obtains a biometric signature from the mobile computing device when accessed thereby. In one embodiment, the generated URI is returned to the general computing device for subsequent delivery to the mobile computing device. In another embodiment, the request to obtain the electronic signature, sent from the general computing device to the remote server device, includes an electronic contact address associated with the mobile computing device. To this end, the remote server device can send an outgoing electronic message, including the generated URI, to the mobile computing device. In further embodiments, the remote server device can also obtain the biometric signature by receiving, in response to sending the outgoing electronic message to the mobile computing device, an incoming electronic message that includes a digital image of the biometric signature. The biometric signature, once obtained by the remote server device, is provided to the general computing device for association with the signature field of the digital document.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 1 is a block diagram illustrating an exemplary system in accordance with some implementations of the present disclosure;

FIG. 3A-3B are screen displays showing a user interface of an electronic messaging application for obtaining a biometric signature in accordance with some implementations of the present disclosure;

FIG. 4 is a screen display showing a user interface of a dynamic web application for obtaining a biometric signature in accordance with some implementations of the present disclosure;

FIG. 11 is a block diagram of an exemplary computing environment suitable for use in implementations of the present disclosure.

DETAILED DESCRIPTION

Figure 2A:
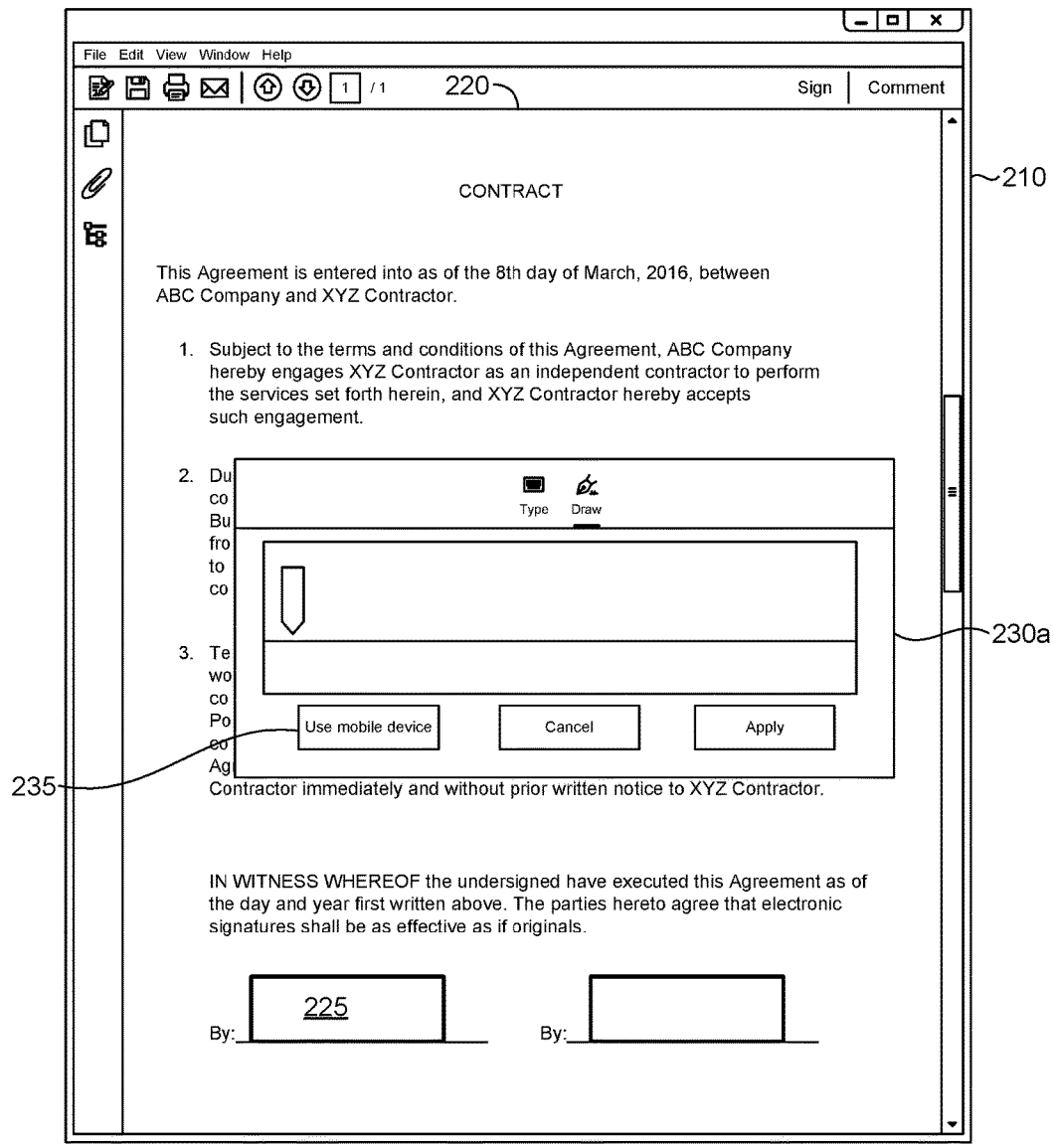
FIG. 2A-2B are screen displays showing a user interface of a document viewer presenting prompts for obtaining a biometric signature from a mobile computing device, to electronically sign a digital document in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

As used herein, the term "biometric signature" refers to the particular dynamics and/or characteristics of a person's uniquely identifiable information. More specifically, a person's biometric signature can include a handwritten signature, a fingerprint, a footprint, a personal photograph (e.g., a mug shot), a personalized video, ocular (e.g. retinal) information, and the like. In one example, a person's biometric signature can be represented by a handwritten signature made with a writing instrument on a writing medium (e.g., a pen on paper). In the digital world, a person's biometric signature can be collected by obtaining a signature made with an input device (e.g., a stylus, digital pen, or finger) on a touchscreen display. Generally, a biometric signature obtained by a touchscreen display of a mobile computing device can include details, such as signature size, input pressure and timing information on various portions of the signature, duration of the signing process, and the like. In another example, a person's biometric signature can be represented by digital data obtained by a computing device. Such digital data can include, among other things, scanned fingerprints, footprints, ocular information, or recorded photographs and videos.

The term "digital document", interchangeable with the term "electronic document" in accordance with embodiments described herein, refers to an electronic representation of a paper document. A digital document can be formatted as any type of electronic document, including Word documents, Portable Document Format (PDF) documents, ASCII text files, HTML files, HTML5 files, JavaScript files, XML files, media (e.g., image) files, and any other electronic document format that can be employed to represent a paper document.

The term "electronic contact address" refers to a unique identifier or contact identifier associated with a person. An electronic contact address for a given person may include, for instance, a mobile phone number, an email address, a social media account identifier, a QR code, and the like. An electronic contact address can be used to contact the associated individual through electronic means, such as text messaging, emailing, online messaging, and the like.

The term "signature vector" refers to one or more line vectors that are input or obtained by a computing device. The signature vector may be obtained by a mouse input, a stylus input, a touch-based input, or any other input method that corresponds to a signatory's motions when providing a signature to a computing device.

The term "signature file" refers to a digital image, video, or other electronic file or attachment that comprises a biometric signature. For instance, a signature can be written with pen on a piece of paper. A photograph of the signature written on the piece of paper may be a signature file. In another instance, a signature file may be a screenshot or cropped portion of a signature displayed in digital form. In other words, a signature that was written on paper and scanned into a digital document can be subsequently cropped to obtain a signature file. In another instance, a signature file can be a media file (e.g., a video file or other electronic file representing a biometric signature) that was obtained or generated by a mobile computing device.

The term "Uniform Resource Identifier" or "URI" refers to a string of characters that references a resource. The reference can enable the interaction with representations (e.g., instances) of the resource over a network, such as the Internet. A common form of URI is a Uniform Resource Locator ("URL"), which is commonly referred to as a web address. A Quick Response Code ("QR Code") may, in some instances, function as a URI. For instance, a QR code may include an encoded URI or URL that references a resource.

The term "dynamic application" refers to an application that does not reside locally on a particular computing device for on-demand execution. For instance, a dynamic application can be accessed only when a user accesses the dynamic application by referencing a particular URI. A common form of dynamic application is a dynamic webpage. Dynamic webpages can generally provide interactive user interfaces configured to receive inputs and provide outputs in real-time. Dynamic webpages oftentimes emulate software applications, without requiring an install of a local instance. Some common forms of dynamic webpages can be implemented using HTML5, DHTML, JavaScript, ActiveX®, or Adobe® Flash®, among other dynamic application programming languages.

The term "electronic message" refers to a digital message that is communicated through a communications network. Electronic messages may include text or multimedia messages communicated over a telecommunications network (e.g., SMS, MMS), a data network (e.g., email, SMS, MMS), a social media network (e.g., WhatsApp®, Facebook® Messenger®, Google® Hangouts® etc.), or any other digital messaging platform.

The term "requesting user" is used herein to refer to a person who employs digital document tools as described herein to view a digital document on a general computing device, and obtain, from a mobile computing device, a biometric signature to sign the digital document.

The term "intended signatory" is used herein to refer to a person for which a signature field of a digital document is intended for. In accordance with embodiments described herein, the intended signatory is the person who views the dynamic application on the mobile computing device, and provides the biometric signature via the dynamic application provided on the mobile computing device. In some instances, the requesting user and the intended signatory can be the same person (e.g., if the requesting user wants to electronically sign the digital document utilizing his mobile computing device).

The term "general computing device" refers to a computing device, such as computing device 1100, later described with reference to FIG. 11, on which a digital document is being provided for display (i.e., viewed by the requesting user). While in most instances, the general computing device is a non-touchscreen computing device (e.g., a desktop PC or non-touchscreen laptop), it is considered within the purview of the present disclosure that the general computing device is any computing device (including touchscreen computing devices) that can at least provide for display the digital document and receive an instruction to obtain a biometric signature from a mobile computing device.

The term "mobile computing device" refers to a computing device, such as computing device 1100, later described with reference to FIG. 11, which can comprise a touchscreen display and/or a digital camera. For example, a smart phone or a tablet may be considered a mobile computing device within the purview of the present disclosure. It is contemplated that the mobile computing device, as referenced herein, need not be limited to having both a camera and touchscreen. For instance, a mobile computing device may have a touchscreen display, but no digital camera. On the other hand, the mobile computing device may have a digital camera, but a non-touchscreen display.

Currently, it is difficult to obtain biometric signatures for electronically signing digital documents on general computing devices (e.g., non-touchscreen computing devices). Available electronic signature tools for mobile computing devices require intended signatories of digital documents to download and view a digital document on a mobile computing device via a locally-installed application in order to electronically sign the digital document. Such tools require that an intended signatory download the digital document and provide a biometric signature using the touchscreen display of the mobile computing device, provided that all of the restrictive requirements for accessing and signing the digital document are met. For instance, if the intended signatory doesn't have the appropriate credentials to access the digital document, the requesting user must provide the intended signatory with the appropriate credentials. Moreover, if the intended signatory doesn't have the appropriate application locally installed on their mobile computing device to access the digital document, the intended signatory doesn't have a means to provide a biometric signature to electronically sign the digital document. Because current solutions require that the complete digital document, or a complete copy thereof, be provided to the mobile computing device in order to obtain an electronic signature for the digital document, such solutions can impede workflow efficiency and waste computing resources, such as bandwidth.

Embodiments of the present invention relate to a solution that can enable any Internet-capable general computing device to efficiently obtain a biometric signature from a mobile computing device (e.g., a mobile phone or tablet) to electronically sign a signature field of a digital document provided for display on the general computing device.

In one embodiment, a digital document having a signature field is provided for display on a general computing device. An instruction to obtain a biometric signature from a mobile computing device associated with an intended signatory is received (for instance, from a requesting user) on the general computing device. The general computing device sends a remote signing request associated with the signature field of the digital document to a remote server device that is configured to retrieve and/or obtain the biometric signature from the mobile computing device. The general computing device receives the biometric signature from the remote server device and associates the biometric signature with the signature field of the digital document, thereby electronically signing the digital document with the biometric signature obtained from the mobile computing device.

In another embodiment, a digital document having a signature field is provided for display on a general computing device. An instruction to obtain a biometric signature from a mobile computing device associated with an intended signatory, the instruction including an electronic contact address associated with the mobile device, is received on the general computing device. The general computing device sends a remote signing request associated with the signature field of the digital document, including the electronic contact address, to a remote server device that is configured to retrieve and/or obtain the biometric signature from the mobile computing device. The general computing device receives the biometric signature from the remote server device and associates the biometric signature with the signature field of the digital document, thereby electronically signing the digital document with the biometric signature obtained from the mobile computing device.

In another embodiment, a remote server device receives, from a general computing device, a request to retrieve a biometric signature from a mobile computing device associated with an intended signatory. The remote server device generates a URI that references a dynamic application provided by the remote server device. The dynamic application provided by the remote server device can obtain the biometric signature when accessed via the URI. The remote server device communicates the generated URI back to the general computing device for communication to the mobile computing device. The dynamic application, once accessed via the generated URI, can obtain the biometric signature from the mobile computing device and store the obtained biometric signature on the remote server device. Once the biometric signature is obtained by the remote server device, the remote server device sends the biometric signature back to the general computing device for electronically signing the signature field of the digital document.

In another embodiment, a remote server device receives, from a general computing device, a request to retrieve a biometric signature from a mobile computing device associated with an intended signatory. Among other things, the request includes an electronic contact address associated with the mobile computing device. The remote server device initializes an outgoing electronic message for delivery to the mobile computing device via the electronic contact address associated therewith. In one aspect, the outgoing electronic message initialized by the remote server device includes a server-generated URI that references a dynamic application provided by the remote server device. The dynamic application provided by the remote server device can obtain the biometric signature when accessed via the URI. The dynamic application, once accessed via the generated URI, can obtain the biometric signature from the mobile computing device and store the obtained biometric signature on the remote server device. Once the remote server device obtains the biometric signature via the dynamic application, the remote server device communicates the biometric signature to the general computing device for electronically signing the signature field of the digital document.

In another aspect, the outgoing electronic message initialized by the remote server device includes a notice (e.g., a text message) to the intended signatory, indicating that they may respond directly to the outgoing electronic message with a signature file (e.g., a photograph of a handwritten signature). The remote server device receives an incoming electronic message comprising the biometric signature from the mobile computing device, which was sent thereby in response to receiving the outgoing electronic message. Once the remote server device obtains the biometric signature via the incoming electronic message, the remote server device communicates the biometric signature to the general computing device for electronically signing the signature field of the digital document.

In another embodiment, an outgoing electronic message is received by a mobile computing device from a remote server device. The outgoing electronic message was sent by the remote server device based on a request sent from a general computing device to the remote server device, the general computing device having a digital document for signature. Once received, the outgoing electronic message is provided for display on the mobile computing device. A responsive electronic message, including a selected signature file, is generated on the mobile computing device. The generated responsive electronic message is sent from the mobile computing device to the remote server device. The remote server device can receive the responsive electronic message from the mobile computing device, and relay the selected signature file to the general computing device to electronically sign the digital document.

In another embodiment, an outgoing electronic message from a remote server device is received by a mobile computing device. The outgoing electronic message includes, among other things, a URI that references a dynamic application configured to obtain a biometric signature from the mobile computing device for a general computing device. The URI is provided for display on the mobile computing device, and is accessed to also provide the dynamic application for display thereon. A biometric signature is sent from the mobile computing device to the remote server device via the dynamic application. The remote server device can obtain the biometric signature via the dynamic application, and relay the biometric signature to the general computing device to electronically sign a digital document provided thereon.

In another embodiment, a QR code displayed on a general computing device is scanned using a camera of a mobile computing device. The QR code was provided to the general computing device in response to a request sent by the general computing device to the remote server device. The mobile computing device identifies a URI encoded in the scanned QR code, that references a dynamic application provided by the remote server device. The dynamic application can obtain a biometric signature from the mobile computing device for the general computing device. The dynamic application is provided for display on the mobile computing device. A biometric signature is sent from the mobile computing device to the remote server device via the dynamic application. The remote server device can receive the biometric signature and relay it to the general computing device to electronically sign a digital document provided thereon.

As was described, a general computing device receives, from a remote server device, a biometric signature obtained from a mobile computing device to electronically sign a digital document provided for display on the general computing device. To this end, embodiments described herein can save resources (e.g., bandwidth, memory, and computing processes) by minimizing the exchange of data between the general computing device and the mobile computing device. In other words, the digital document is not communicated between devices when obtaining biometric signatures for electronically signing digital documents. Embodiments allow a requesting user to send requests for biometric signatures to any intended signatory without concern of whether the intended signatory has the appropriate application or appropriate credentials to electronically sign the digital document. Similarly, the intended signatory can easily provide their biometric signature to electronically sign the requesting user's digital document without concern of workflow compliance restrictions.

With reference now to the drawings, FIG. 1 is a block diagram illustrating an exemplary system 100 for obtaining biometric signatures for electronically signing digital documents in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. It should be understood that any number of user devices and servers may be employed within the system 100 within the scope of the present disclosure. Each of the servers and client devices shown in FIG. 1 may be implemented via a computing device, such as computing device 1100, later described with reference to FIG. 11, for example. The components may communicate with each other via network 130. Each may comprise a single device or multiple devices cooperating in a distributed environment. Additionally, other components not shown may also be included within the system 100.

Initialization of Remote Electronic Signature Retrieval

Among other components not shown, the system 100 includes, at a high level, a general computing device 110 having a document viewer 112, such as ADOBE® ACROBAT® (available from Adobe Systems Inc. of San Jose, Calif.), configured to view and/or manipulate digital documents (e.g., Portable Document Format "PDF" files). The document viewer 112 can include a biometric signature requesting component 114 configured to receive an instruction (for instance, from a requesting user) to obtain a biometric signature from a mobile computing device (for instance, the mobile computing device associated with the intended signatory) for electronically signing the signature field of the digital document. In some embodiments, the biometric signature requesting component 114 can be configured to prompt for and receive an electronic contact address associated with the mobile computing device.

By way of example only, the requesting user can initialize an electronic signing process for the signature field by providing an input corresponding to the signature field. The requesting user can further select how the biometric signature is to be obtained. For instance, the requesting user can initialize the biometric signature requesting component 114 by providing an input or otherwise selecting an option on the document viewer 112 indicating that a biometric signature retrieved from a remote mobile computing device is desired for the designated signature field of the digital document. In some embodiments, the requesting user can provide the biometric signature requesting component 114 with the intended signatory's electronic contact address (e.g., mobile phone number), which would in turn initiate a biometric signature retrieval session for retrieving the biometric signature for the particular signature field from the mobile computing device.

With brief reference to FIG. 2A, an exemplary user interface 200a of a document viewer 210 presenting both a digital document 220 and a first prompt 230a for electronically signing a signature field 225 of the digital document 220 is provided. In the illustrated embodiment, the first prompt 230a is presented by the document viewer 210 in response to a received input (e.g., a mouse click or other selection) that corresponds to the signature field 225. The first prompt 230a for electronically signing the signature field 225 of the digital document 220 can present, among other things, a "Use mobile device" option 235 that, when selected, can initialize a second prompt for initiating a biometric signature retrieval session.

Figure 2B:
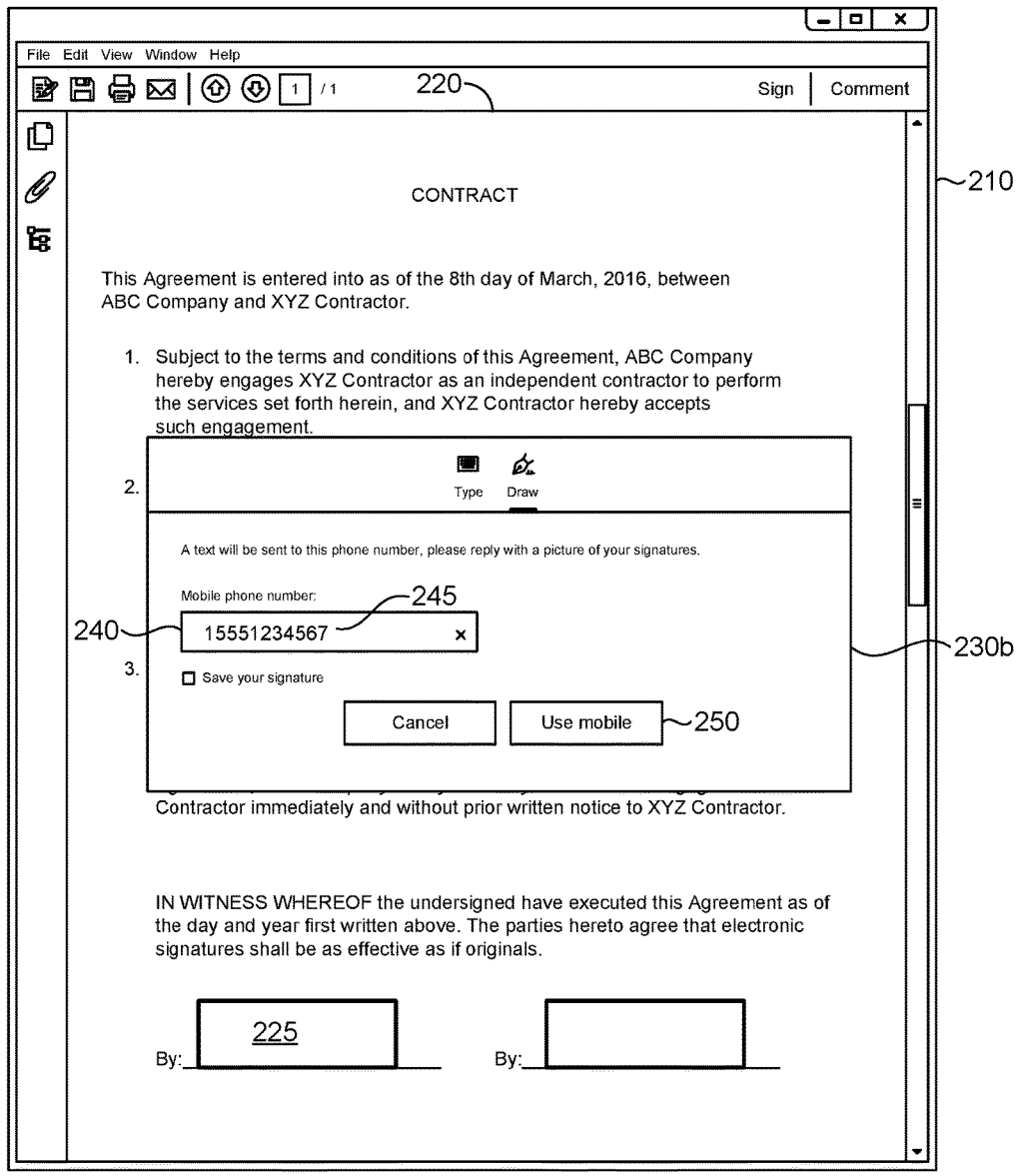

With brief reference to FIG. 2B, an exemplary user interface 200b of a document viewer 210 presenting both a digital document 220 and a second prompt 230b for electronically signing a signature field 225 of the digital document 220 is provided in accordance with some implementations of the present disclosure. In the illustrated embodiment, a "Mobile phone number:" electronic contact address field 240 is displayed, along with a "Use Mobile" submit request button 250. As such, the illustrated embodiment shows that a mobile phone number associated with the mobile computing device is the requested type of electronic contact address for this particular signing workflow. As illustrated, the electronic contact address field 240 can receive, via user input, the intended signatory's electronic contact address 245, here being the mobile phone number associated with the mobile computing device.

The Remote Electronic Signature Retrieval Process

Looking back now to FIG. 1, the biometric signature requesting component 114 can send a request to one or more signature retrieval servers 120 to initialize a biometric signature retrieval session. In some embodiments, the request may include an electronic contact address associated with a mobile computing device 130. The signature retrieval server(s) 120 are configured to request and/or obtain the intended signatory's biometric signature from the mobile computing device 130. The request to initiate the biometric signature retrieval session is communicated to the one or more signature retrieval servers 120 over a network 140, which may include, without limitation, one or more local area networks (LANs) and/or wide area networks (WANs), such as the Internet. A network 140 can also include direct and/or indirect communication links between devices of system 100 including Bluetooth, GPS, Ethernet, RF, HDMI, Zigbee, and WiFi based interfaces. While embodiments described herein illustrate the signature retrieval server(s) 120 being in communication with the general computing device 110 over a network, it is contemplated that the general computing device 110 and the components of signature retrieval server(s) 120, as will be described in more detail with reference to FIG. 5, may embodied as a single computing device.

The one or more signature retrieval servers 120 can initialize a biometric signature retrieval session in response to receiving the request from the biometric signature requesting component 114. As was described, the request can include, among other things, the electronic contact address of the intended signatory, and thereby, the electronic contact address associated with the mobile computing device 130. By way of example only, the intended signatory's electronic contact address (for instance, mobile phone number 245 of FIG. 2B) is communicated to the one or more signature retrieval servers 120 when a biometric signature retrieval session is initialized by the general computing device 110 (for instance, after the requesting user completes electronic contact address field 240 of FIG. 2B and "Use mobile" form button 250).

In one embodiment, when the biometric signature retrieval session is initialized, the one or more signature retrieval servers 120 can initialize and/or send an outgoing electronic message 122 to the electronic contact address associated with the mobile computing device. The electronic message can include, among other things, a unique Uniform Resource Identifier ("URI") 124 or variation thereof associated with the session that corresponds to or references a corresponding instance of a dynamic biometric signature-obtaining application provided by and accessible from the one or more signature retrieval servers 120. In preferred embodiments, the outgoing electronic message is delivered to the mobile computing device 130 associated with the electronic contact address. In other embodiments, when the biometric signature retrieval session is initialized, the one or more signature retrieval servers 120 generate the URI and return the URI to the general computing device 110, so that the general computing device 110 can send the URI to the mobile computing device 130.

Electronically Signing the Remote Digital Document

The mobile computing device 130 is preferably configured to receive the outgoing electronic message sent by the one or more servers. To this end, the URI, and thereby the dynamic biometric signature-obtaining application, is only accessible on the mobile computing device 130, and as such, to the intended signatory. In some embodiments, the URI included in the outgoing electronic message, and as such the dynamic biometric signature-obtaining application, does not need to be accessed in order to obtain the biometric signature. Instead, the one or more servers can be configured to receive an incoming electronic message, sent by the mobile computing device 130, in response to the mobile computing device 130 having received the outgoing electronic message. In other words, the mobile computing device 130 may send a responsive electronic message to the one or more signature retrieval servers 120, in response to having received the outgoing electronic message sent from the one or more signature retrieval servers 120. The incoming electronic message may include an image of a biometric signature. It is contemplated that in embodiments where biometric signatures are obtained only through incoming electronic messages, a URI would not need to be generated or sent via an outgoing electronic message to the mobile computing device because a simple response including the incoming electronic message would be sufficient to associate the biometric signature included therein with the appropriate biometric signature retrieval session.

With reference now to FIG. 3A, an exemplary screen display 300a on a mobile computing device is provided, showing text messaging application 310 displaying received outgoing electronic message 320. The received outgoing electronic message 320 includes an instructional message 322 and a unique URL 324 that references an instance of the dynamic biometric signature-obtaining application. While the illustrated embodiment shows an electronic message in the form of a text message, it is contemplated that many other types of electronic messages are suitable for the present invention. For instance, email, instant messages, and social media messages, are all within the purview of the present disclosure.

Looking now at FIG. 3B, another exemplary screen display 300b on a mobile computing device is provided, also showing text messaging application 310 displaying received outgoing electronic message 320, and further showing a responsive electronic message 330 comprising a signature file 332. In the illustrated embodiment, an intended signatory can employ features of a messaging application on the mobile computing device to attach or send, in response to the received electronic message 320, a signature file. In this regard, the one or more signature retrieval servers 120 of FIG. 1 can receive the responsive electronic message 330 as an incoming electronic message, to obtain the intended signatory's biometric signature.

Moving now to FIG. 4, an exemplary screen display 400 on a mobile computing device is provided, showing web browser 410 presenting a user interface 420 of a dynamic biometric signature-obtaining application 430 for obtaining a biometric signature. The biometric signature-obtaining application 430 is provided via web browser 410 accessing the corresponding URL 440. In accordance with embodiments described herein, the dynamic application is configured to present, immediately upon being accessed via the URL, options for obtaining the biometric signature from the mobile computing device. In the illustrated embodiment, once the dynamic biometric signature-obtaining application 430 is loaded via the URL, it can immediately present, among other things, a touch-input-based signature block 450 configured to receive a signature vector via a touch-based input. It is noted here that in some embodiments, the digital document is not necessarily received or provided for display on the mobile computing device. That is, some embodiments may be directed to merely obtaining the intended signatory's biometric signature and not to communicate the document between devices for review.

The dynamic biometric signature-obtaining application 430 can also present a signature file upload button 460 (depicted by the "Choose a Picture" button) configured to allow the intended signatory (or person viewing the dynamic web application 430) to choose an image stored in a memory of the mobile computing device for upload (e.g., to the one or more signature retrieval servers 120 of FIG. 1). Although not shown, in some embodiments, activation of the signature file upload button 460 can present additional options that may include, among other things, initializing a camera mode on the mobile computing device, such that the intended signatory can take a photograph of their biometric signature for upload (for instance, to the one or more signature retrieval servers 120 of FIG. 1). In this regard, the dynamic biometric signature-obtaining application 430 can obtain a biometric signature from a mobile computing device that is accessing the generated URL 440 associated with the biometric signature retrieval session.

In some embodiments, the biometric signature can comprise secondary authenticating information associated the intended signatory for indicating verifiable approval of the document. For instance, secondary authenticating information can include detected fingerprint data, received password data, detected geolocation data, detected voice recognition data, detected facial recognition data, detected unique device information, or even an authenticating video, among many other types of data unique to a person. Such secondary authenticating information can be detected or generated by a mobile computing device. In some embodiments, secondary authenticating information can be obtained in addition to the obtained "handwritten" biometric signature. By way of example only, the dynamic biometric signature-obtaining application 430 can be configured to obtain, in addition to a "handwritten" signature, a fingerprint scan associated with the intended signatory. In other embodiments, secondary authenticating information can be obtained in lieu of the "handwritten" biometric signature. By way of example only, a video recording of the intended signatory stating "I approve of this document" may be considered a legally-binding approval or signature in some jurisdictions. In such cases, a multimedia file (i.e., the authenticating video) can be obtained by the mobile computing device in lieu of the biometric signature. In essence, the biometric signature can be whichever secondary authentication information is obtained by the mobile computing device. It is contemplated, however, that the various components described herein, particularly with respect to FIGS. 1 and 5, would be configured to facilitate the obtaining of such secondary authenticating information.

Applying the Remote Electronic Signature

Referencing back to FIG. 1, when the one or more signature retrieval servers 120 obtain the biometric signature 132 for the biometric signature retrieval session, either via the dynamic biometric signature-obtaining application or as an incoming electronic message responsive to the outgoing electronic message, the obtained biometric signature 132 can be provided to the electronic signature requesting component 114 for association with and/or placement into the signature fields of the digital document. To this end, the digital document is electronically signed with a digital representation of the intended signatory's biometric signature, the intended signatory's biometric signature being obtained from the mobile computing device 130.

The Signature Retrieval Server

Figure 5:
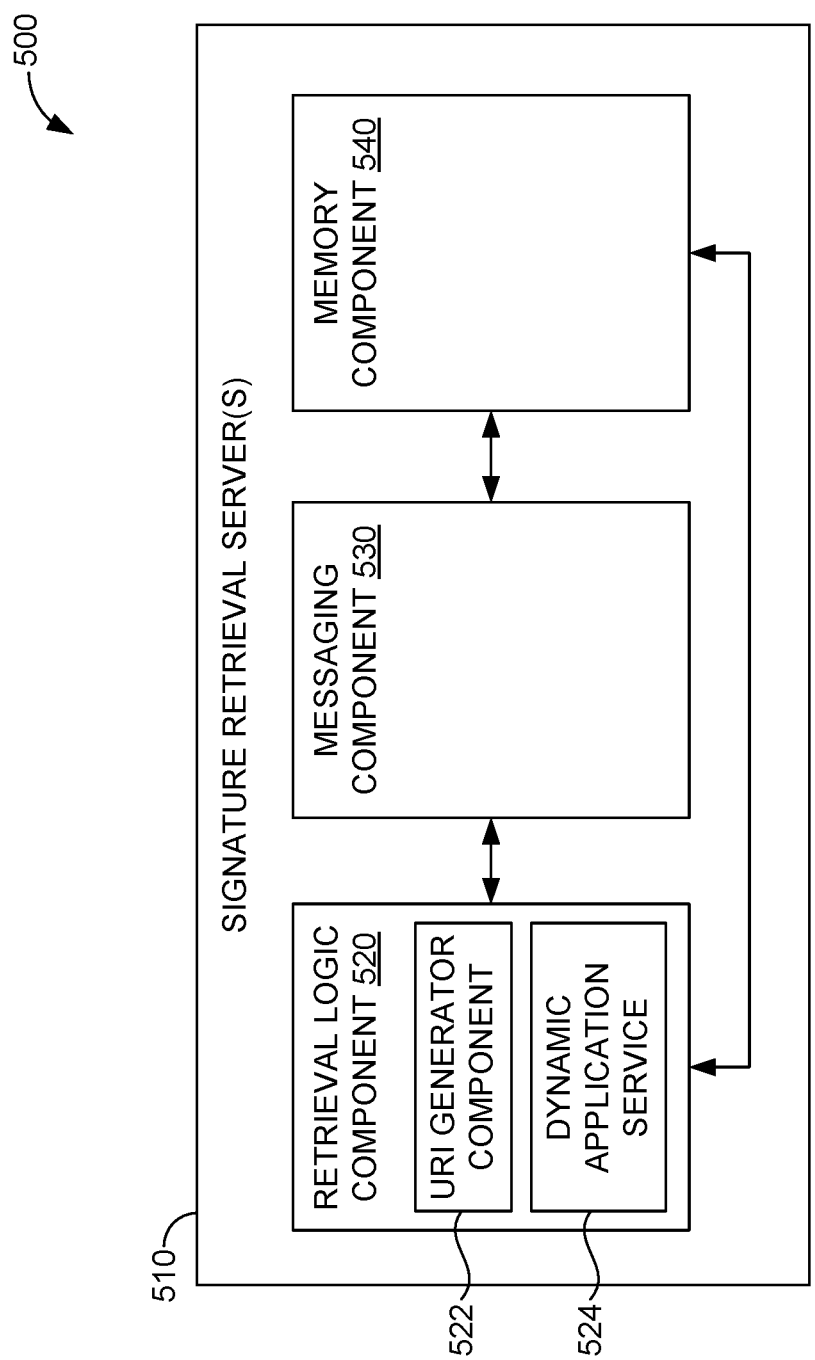
FIG. 5 is a block diagram illustrating an exemplary signature retrieval server of the system in accordance with some implementations of the present disclosure.

Referring now to FIG. 5, a block diagram illustrating an exemplary server-side system implementation 500 of the system in accordance with some implementations of the present disclosure is provided. The one or more signature retrieval servers 120 of FIG. 1 are represented in FIG. 5 as signature retrieval server 510 comprising a retrieval logic component 520, a messaging component 530, and a memory component 540. While the illustrations show each component 520, 530, 540 embodied as individual components, it is contemplated that the components 520, 530, 540 are embodied in any configuration (e.g., as a single component) for performing the operations in accordance with the present disclosure. It is also contemplated that the components 520, 530, 540 may be embodied in any combination of one or more server computing devices. That is, each component may be implemented in a separate server computing device, or any combination of components may be implemented in two or more server computing devices in communication with one another.

It is also contemplated that other components (not shown) may be included in the signature retrieval server 510, which may facilitate obtaining biometric signatures for electronically signing digital documents in accordance with implementations of the present disclosure. For instance, the biometric signature requesting component 114 of FIG. 1 may be in direct communication with a secured/firewalled server device (not shown) configured to receive electronic signatures only from authenticated users of such a secured device. By way of example only, a secured server device, such as an AdobeSign® server, may be in direct communication with the document viewer 112 of FIG. 1. However, in order to enable the embodiments described herein, it is contemplated that the retrieval logic component 520 may be publicly accessible (i.e., not behind a firewall or requiring authentication), and may be in direct communication with the secured server device. In this regard, the signature retrieval server 510 may have indirect communications with the biometric signature requesting component 114 of FIG. 1, to provide the document viewer 112 of FIG. 1 with an obtained biometric signature.

The retrieval logic component 520 of FIG. 5 can receive instruction(s) or a "request" from the biometric signature requesting component 114 of FIG. 1 to initiate a biometric signature retrieval session. The retrieval logic component 520 can include a URI generator component 522 configured to generate a unique URI referencing a dynamic web application (hereinafter referred to as "dynamic biometric signature-obtaining application"), and a dynamic application service 524 configured to provide the dynamic biometric signature-obtaining application. The retrieval logic component 520 can initialize a new session that corresponds to the request. In some embodiments, the new session is initialized in response to receiving the request. In more detail, for each session, the retrieval logic component 520 employs the dynamic application service 524 to initialize a new instance of the dynamic biometric signature-obtaining application, and also employs the URI generator component 522 to generate a unique URI that references the new instance of the dynamic biometric signature-obtaining application. In this regard, the unique URI is paired with a particular instance of the dynamic biometric signature-obtaining application.

In accordance with embodiments described herein, the URI generator component 522 can generate a one-time use URI that essentially "deactivates" the URI after the particular instance of the dynamic biometric signature-obtaining application is accessed via the URI only one time. In other words, the URI can stop referencing the corresponding instance of the dynamic biometric signature-obtaining application after the URI is accessed once by any computing device. The URI generator component 522 can also employ cryptographically-strong and/or randomly-generated strings when generating the unique URI. As such, a generated URI can be difficult to visibly copy (e.g., by glancing over a person's shoulder) or predict (e.g., by knowing previously-generated URIs) without having direct access to the URI. In some embodiments, the URI generator component 522 can generate URIs that have periods of expiration associated therewith. In other words, the URI can be "deactivated" or can stop referencing its corresponding instance of the dynamic biometric signature-obtaining application after a predetermined duration of time after generation. It is also contemplated that instances of the dynamic biometric signature-obtaining application can be generated, by dynamic application service 524, similarly having a period of expiration associated therewith.

In one embodiment, the retrieval logic component 520 can employ the messaging component 530 to send an electronic message to the mobile computing device via the electronic contact address associated therewith. The electronic message can include a unique URI that references a corresponding instance of a dynamic biometric signature-obtaining application. The dynamic biometric signature-obtaining application is provided by the signature retrieval server 510, preferably by the retrieval logic component 520.

In one embodiment, once the electronic message is sent to the electronic contact address associated with the mobile computing device, the messaging component 530 can obtain the biometric signature by receiving an incoming electronic message from the electronic contact address associated with the mobile computing device. For instance, if the intended signatory receives the outgoing electronic message on his mobile computing device, he may provide (e.g., send) a signature file in direct response to the electronic message received on his mobile computing device. Once the incoming electronic message including the signature file is received by the messaging component 530, it can be stored in the memory component 540 as the biometric signature associated with the biometric signature retrieval session. In some embodiments, the memory component 540 can maintain the biometric signature associated with the biometric signature retrieval session, indefinitely, for purposes of maintaining an audit trail. For instance, if the need to verify that a particular biometric signature came from a particular electronic contact address, the memory component 540 can be referenced to determine whether the electronic contact address associated with the biometric signature retrieval session in which the particular biometric signature was obtained is the appropriate electronic contact address.

The memory component 540 can be a database or other computer-readable medium configured to store biometric signatures in accordance with corresponding biometric signature retrieval sessions. In some embodiments, the retrieval logic component 520 can be configured to monitor the memory component 540 to determine whether the biometric signature associated with the biometric signature retrieval session has been received. In other embodiments, the memory component 540 or other component of the retrieval server 510 can be configured to notify, send, and/or provide the biometric signature associated with the biometric signature retrieval session to the retrieval logic component 520 in response to receiving and storing the biometric signature.

In further embodiments, once the electronic message is sent to the mobile computing device via the electronic contact address, and accessed thereby, the dynamic biometric signature-obtaining application provided by the retrieval logic component 520 can obtain the biometric signature in accordance with embodiments described herein. In some instances, the obtained biometric signature can be stored in the memory component 540 in association with the biometric signature retrieval session. Similarly, the memory component 540 can maintain the biometric signature associated with the biometric signature retrieval session, indefinitely, for purposes of maintaining an audit trail. For instance, if the need to verify that a particular biometric signature came from a particular mobile computing device, the memory component 540 can be referenced to determine whether logged characteristics associated with the particular mobile computing device (e.g., IP address, browser identifier, IMEI, cookie data, etc.) associated with the biometric signature retrieval session in which the particular biometric signature was obtained is the appropriate electronic contact address.

Once the retrieval logic component 520 has obtained the biometric signature from the mobile computing device, via either one of the dynamic biometric signature-obtaining application or the memory component 540 by way of the messaging component 530, the retrieval logic component 510 can communicate the biometric signature to the document viewer 112 of FIG. 1. As such, the document viewer 112 of FIG. 1 can associate the biometric signature with the appropriate digital document signature field(s) corresponding to the initial request.

Methods for Requesting Remote Electronic Signatures for Local Digital Documents

Figure 6:
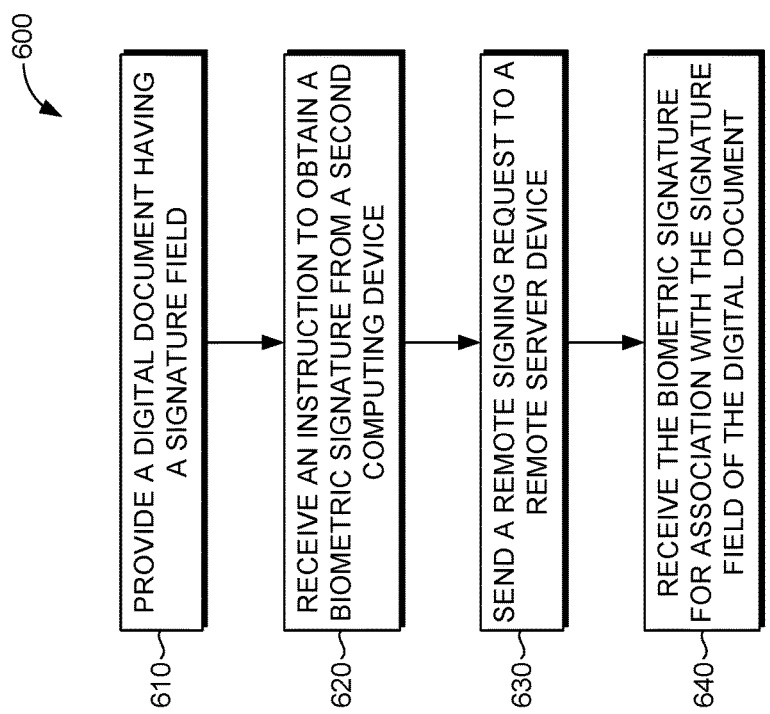
FIG. 6 is a flow diagram showing methods for requesting electronic signatures from remote devices to electronically sign local digital documents in accordance with implementations of the present disclosure.

Having described various aspects of the present disclosure, exemplary methods are described below for obtaining biometric signatures for electronically signing digital documents. Referring to FIG. 6 in light of FIGS. 1-5, FIG. 6 is a flow diagram showing a method 600 for requesting biometric signatures for electronically signing digital documents. Each block of method 600 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 610, a digital document having a signature field is provided for display on a general computing device. The digital document can be a digital representation of any paper document, and can also include one or more signature field configured to receive an electronic signature. The digital document is presented in a document viewer, such as document viewer 112 of FIG. 1. By way of example only, the digital document can be a PDF file having and an electronic signature field provided thereon, and can be presented in Adobe® Acrobat®.

At block 620, an instruction to obtain a biometric signature from a mobile computing device for association with the one or more signature fields of the digital document is received. A requesting user can designate one or more signature fields of the digital document for receiving the biometric signature from the mobile computing device. The instruction can be received by the document viewer.

In response to receiving the instruction, an electronic signature requesting component, such as electronic signature requesting component 114 of FIG. 1, can prompt the requesting user to provide an electronic contact address associated with the mobile computing device. In embodiments, the electronic signature requesting component can obtain the electronic contact address from an electronic contact address form field presented to the requesting user, or from a selected contact from a contact list.

The electronic contact address can be any electronic contact address as specified or accepted by the electronic signature requesting component 114 of FIG. 1. For instance, the electronic contact address can be a mobile phone number, an email address, a social media account handle, a messaging/chat service handle, or any unique identifier associated with a messaging service with which embodiments of the present disclosure are compatible. In some embodiments, the electronic signature requesting component 114 of FIG. 1 can also obtain notes provided by the requesting user and/or predefined instructions for inclusion in an electronic message to be sent to the electronic contact address associated with the intended signatory.

At block 630, a remote signing request associated with the one or more signature field of the digital document is sent to a remote server device, such as signature retrieval server 120 of FIG. 1. In some embodiments, the obtained electronic contact address, notes and/or predefined instructions can also be included in the request. The remote server device can be configured to initialize a biometric signature retrieval session in response to receiving the request. In accordance with some embodiments described herein, the remote server device can utilize the electronic contact address to obtain the biometric signature associated with the intended signatory.

More particularly, the remote server device can generate a unique URI that corresponds to an instance of a dynamic application, such as dynamic biometric signature-obtaining application 524 of FIG. 5, provided by the remote server device. In some embodiments, the generated URI can be a one-time use URI, such that once accessed, the URI will no longer reference the dynamic application. Such a feature can alleviate security concerns, in that once a biometric signature is obtained, the biometric signature retrieval session is concluded (outside of sending the biometric signature back to the digital document for electronic signature). In further embodiments, the generated URI or the corresponding instance of the dynamic application can be configured to expire after a predetermined period of time (e.g., 15 minutes). In this way, further security concerns can be alleviated, in that biometric signature retrieval sessions cannot extend beyond a particular duration of time.

In some embodiments, the remote server device can send the generated URI to the mobile computing device via the electronic contact address. In other embodiments, the remote server device can return the generated URI to the general computing device for alternative delivery to the mobile computing device. In accordance with embodiments described herein, the dynamic application can obtain, from the mobile computing device, a biometric signature associated with the intended signatory in the form of a signature vector or signature file. In other embodiments, the remote server device can obtain the biometric signature in a responsive incoming electronic message from the mobile computing device via the electronic contact address associated therewith. In other words, the incoming electronic message received in direct response to the outgoing electronic message may include a signature file associated with the intended signatory. At block 640, the biometric signature is received by the general computing device, from the remote server device, for association with the one or more signature fields of the digital document.

Methods for Retrieving Remote Electronic Signatures from a Remote Device

Figure 7:
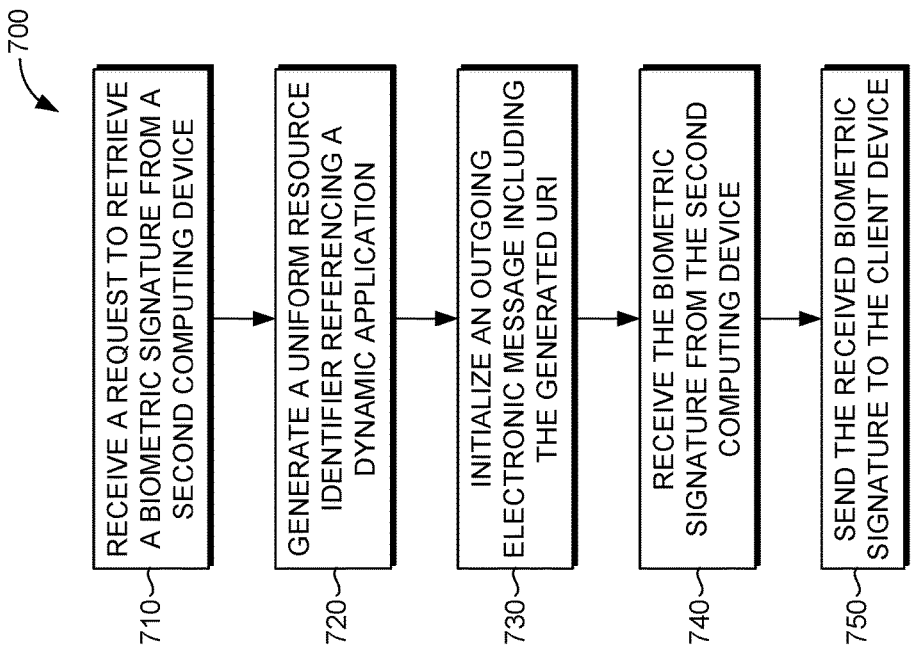
FIG. 7 is a flow diagram showing methods for retrieving electronic signatures from remote devices to electronically sign digital documents in accordance with implementations of the present disclosure.

Referring to FIG. 7 in light of FIGS. 1-5, FIG. 7 is a flow diagram showing a method 700 for retrieving biometric signatures for electronically signing digital documents. Each block of method 700 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 710, a request to retrieve a biometric signature from a mobile computing device for association with one or more signature fields of a digital document on a general computing device is received from the general computing device. In some embodiments, the request may include, among other things, an electronic contact address associated with the mobile computing device.

At block 720, in response to receiving the request, a URI referencing a dynamic application in accordance with embodiments described herein is generated. The generated URI is unique, corresponds to a biometric signature retrieval session associated with the request, and references a unique instance of a dynamic application, such as dynamic biometric signature-obtaining application 524 of FIG. 5. In some embodiments, the generated URI may be configured to have a one-time use configuration, an expiration period after time of generation, and/or can be generated using cryptographically strong and randomly-generated strings. Each of the foregoing URI characteristics can provide improved security advantages that deter undesirable exposure of biometric signature retrieval sessions.

At block 730, an outgoing electronic message, including at least the generated URI in accordance with some embodiments described herein, is initialized for sending to the mobile computing device via the electronic contact address included in the request. In other words, according to some embodiments, a request to send an outgoing electronic message including the URI according to some embodiments may be initialized by a retrieval logic component, such as retrieval logic component 520 of FIG. 5. Further, the initialized request can be communicated to a messaging component, such as messaging component 530 of FIG. 5, for delivery to the mobile computing device via the electronic contact address included in the request. In certain embodiments, the retrieval logic component communicates at least the electronic contact address associated with the mobile computing device, a message including at least the generated URI, and a session identifier or some other form of electronic contact return address associated with the session, to the messaging component. Such information is communicated to the messaging component directly or via a network, such as network 140 of FIG. 1. The message can include other information, such as instructions or notes for presentation to the intended signatory, as described hereinabove.

The session identifier or electronic contact return address is provided to indicate a return destination for the obtained biometric signature. The messaging component can receive messaging requests associated with the session identifier or electronic contact return address. The messaging requests can include at least the electronic contact address and the message. The messaging component can then send the message to the electronic contact address. In some embodiments, the messaging component is also configured to receive a response message (e.g., a signature file received from the mobile computing device via the electronic contact address) and associate it to the return destination.

In one embodiment, the messaging component can be a telephony service, such as the cloud-based texting service provided by communications company Twilio®, configured to send and/or receive text messages (e.g., SMS or MMS) via telecommunications networks by way of web-based APIs. In another embodiment, the messaging component 530 can be an email service configured to send and/or receive email messages through a network, such as network 140. In further embodiments, the messaging component 530 can be a social media message exchange service (e.g., Facebook® Messenger, WhatsApp®, KakaoTalk®, etc.) configured to send and/or receive text or multimedia messages via the social media network.

At block 740, the biometric signature associated with the intended signatory is received from the mobile computing device via one of the dynamic application described in accordance with embodiments described herein, or an incoming electronic message from the mobile computing device via the electronic contact address, as was described hereinabove. At block 750, the biometric signature received from the mobile computing device, and associated with the intended signatory, is communicated to the client device for association with the one or more signature fields of the digital document.

Methods for Electronically Signing a Remote Digital Document

Figure 8:
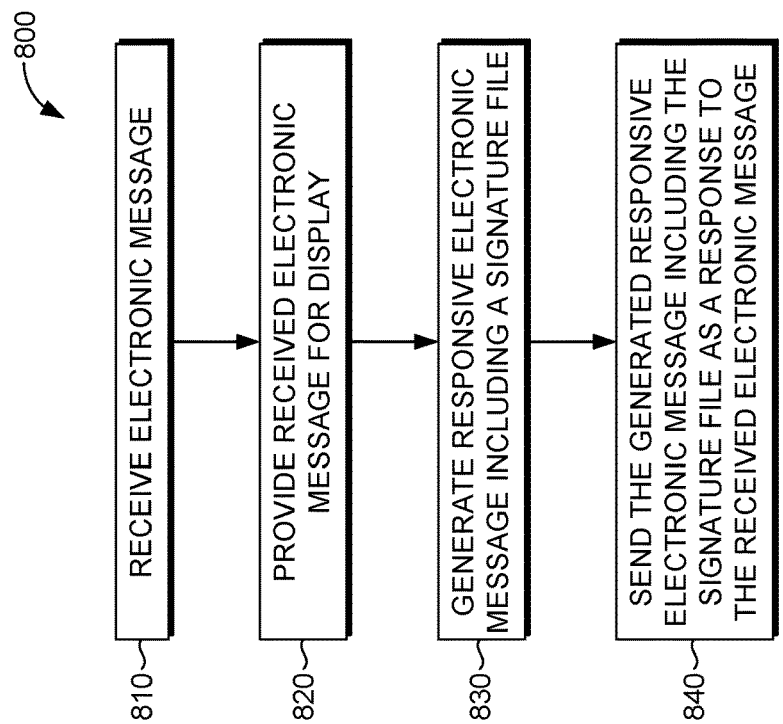

Referring to FIG. 8 in light of FIGS. 1-5, FIG. 8 is a flow diagram showing a method 800 for electronically signing remote digital documents. Each block of method 800 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 810, an outgoing electronic message (for instance, the outgoing electronic message sent by the one or more signature retrieval servers 120 of FIG. 1) is received by a mobile computing device, from a remote server device. The outgoing electronic message is received by an electronic contact address associated with the mobile computing device, from an electronic contact address associated with the remote server device. The outgoing electronic message includes at least a URI referencing a dynamic application in accordance with embodiments described herein and/or a notice (e.g., a message). The notice can be any message to the intended signatory, but preferably indicates to the intended signatory that a direct response to the received outgoing electronic message, including a signature file provided by the intended signatory, can electronically sign a signature field of a digital document provided on a remote requesting computing device.

At block 820, the received outgoing electronic message is provided for display on the first computing device. For instance, the message can be provided for display in an electronic messaging application of the mobile computing device. Examples of electronic messaging applications may include texting (e.g., SMS) applications, email applications, social messaging applications, and the like.

At block 830, a responsive electronic message is generated on the mobile computing device. The responsive electronic message can be generated by receiving, among other things, a signature file selected or provided by the user via a GUI provided for display on the mobile computing device. For instance, the signature file can be selected by adding a preexisting attachment (e.g., an image, a video, a media file) available in a memory of the mobile computing device. In another instance, the signature file can be selected by initializing the creation of a new attachment that, once created, will be available in the memory of the mobile computing device. For example, the intended signatory could initiate an image capture function, within the messaging application, to activate a camera of the mobile computing device to take a picture of their handwritten signature. In another example, the intended signatory could initiate a video capture function, also within the messaging application, to active the camera of the mobile computing device to take a video of themselves making an assertive statement agreeing to the terms of the document.

At block 840, the generated responsive electronic message, including the selected signature file, is sent to the remote server device. The remote server device can then receive the responsive electronic message from the first computing device and relay the contents thereof to the requesting computing device. In other words, once the remote server device receives the responsive electronic message, it then provides the selected signature file included in the received responsive electronic message to the requesting computing device.

Figure 9:
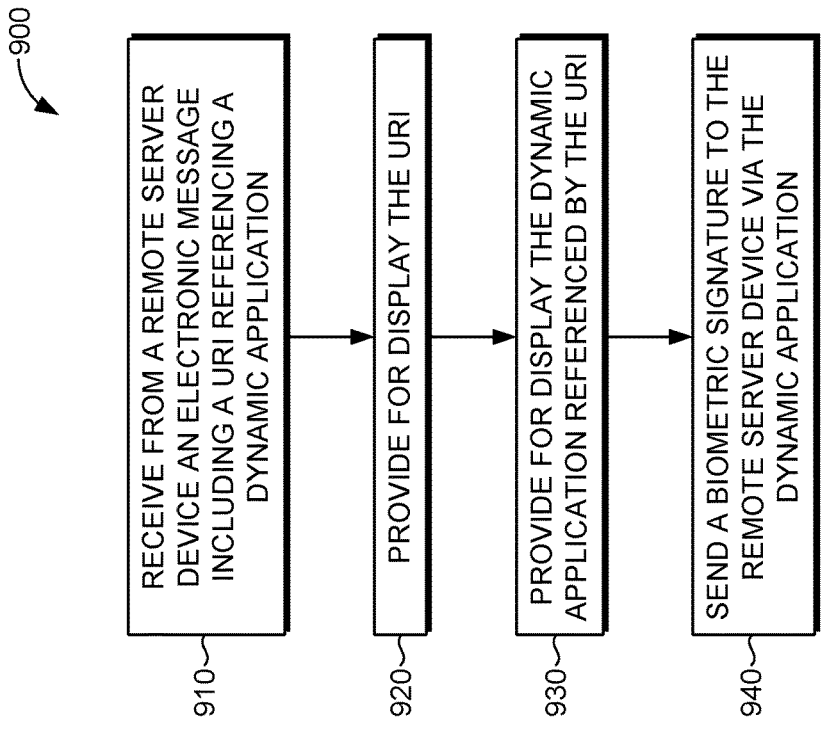
FIGS. 8-10 are flow diagrams showing methods for electronically signing remote digital documents in accordance with implementations of the present disclosure.

Referring to FIG. 9 in light of FIGS. 1-5, FIG. 9 is a flow diagram showing another method 900 for electronically signing remote digital documents. Each block of method 900 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 910, an outgoing electronic message (for instance, the outgoing electronic message sent by the one or more signature retrieval servers 120 of FIG. 1) is received by a mobile computing device, from a remote server device. The outgoing electronic message is received by an electronic contact address associated with the mobile computing device, sent from an electronic contact address associated with the remote server device. The outgoing electronic message includes at least a URI referencing a dynamic application in accordance with embodiments described herein. As was described, the dynamic application can obtain a biometric signature to electronically sign a signature field of a digital document provided for display on a remote requesting computing device. In some embodiments, a notice can also be included, preferably indicating to the intended signatory that a direct response to the received outgoing electronic message, including a signature file provided by the intended signatory, can electronically sign a signature field of a digital document provided for display on a remote requesting computing device.

At block 920, at least the URI included in the received outgoing electronic message is provided for display on the mobile computing device. For instance, the message can be provided for display in an electronic messaging application of the mobile computing device. Examples of electronic messaging applications may include texting (e.g., SMS) applications, email applications, social messaging applications, and the like. It is contemplated that the displayed URI is provided as a dynamic link that, when interacted with by a user, is configured to execute a corresponding application to access the URI. In accordance with embodiments described herein, when interacted with the dynamic link may execute, for instance, a web browser.

At block 930, the dynamic application referenced by the URI is provided for display, in response to being accessed via the URI. In accordance with embodiments described herein, the dynamic application can be provided for display on any web browser, such that no particular application need be installed in order to access the dynamic application.

At block 940, a biometric signature is sent from the mobile computing device to the remote server device via the dynamic application accessed and provided for display on the mobile computing device. The remote server device can, in accordance with embodiments described herein, relay, by receiving then sending, the biometric signature to the remote requesting computing device to electronically sign the digital document provided for display thereon.

Figure 10:
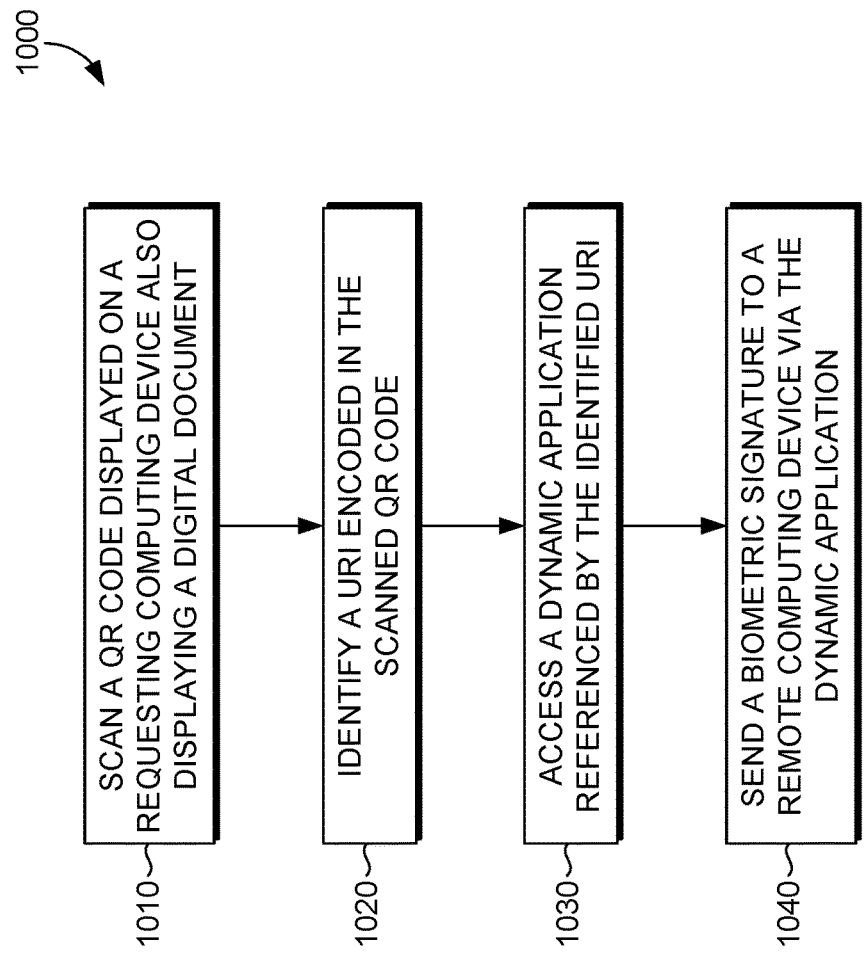

Referring to FIG. 10 in light of FIGS. 1-5, FIG. 10 is a flow diagram showing another method 1000 for electronically signing remote digital documents. Each block of method 1000 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 1010, a QR code displayed on a remote requesting computing device is scanned using a camera of a mobile computing device. The QR code is displayed on the remote requesting computing device based on a request that the remote requesting computing device made to a remote server device. In accordance with embodiments described herein, the request was sent to the remote server device to generate a unique URI (here, the QR code) referencing a dynamic application configured to obtain a biometric signature from a mobile computing device, in order to electronically sign a signature field of a digital document provided for display on the remote requesting computing device.

At block 1020, a URI encoded in the scanned QR code is identified by the mobile computing device. In some embodiments, the mobile computing device is configured to automatically access the identified URI upon scanning and identification.

At block 1030, the dynamic application accessed via the identified URI is provided for display on the mobile computing device, in accordance with embodiments described herein.

At block 1040, a biometric signature is sent from the mobile computing device to the remote server device, via the dynamic application. In accordance with embodiments described herein, the remote server device can relay the obtained biometric signature to the digital document displayed on the remote requesting computing device to electronically sign the signature field.

With reference to FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

As described above, implementations of the present disclosure relate to techniques for obtaining biometric signatures for electronically signing digital documents. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by one or more computing devices, cause the one or more computing devices to perform operations comprising:
   receiving, via a displayed graphical user interface (GUI), an instruction to request a biometric signature from a remote computing device for association with a signature field of a displayed digital document;
   generating a remote signing request for communication to a remote server device based on the received instruction, wherein communication of the generated remote signing request causes the remote server device to obtain the biometric signature from the remote computing device based on a request sent thereto by the remote server device; and
   receiving the obtained biometric signature from the remote server device for association with the signature field of the digital document.

2. The medium of claim 1, wherein the biometric signature is obtained via an interface that immediately requests the biometric signature when accessed via a Uniform Resource Identifier (URI) generated by the remote server device.

3. The medium of claim 2, wherein the biometric signature includes at least one of a signature vector, a signature file, and a piece of secondary authenticating information.

4. The medium of claim 2,
   wherein an electronic contact address associated with the remote computing device is included in the generated remote signing request, and wherein the generated URI is sent from the remote server device to the electronic contact address.

5. The medium of claim 4, wherein
   the biometric signature is obtained as an attachment to an electronic message sent from the remote computing device via the electronic contact address.

6. The medium of claim 4, wherein the electronic contact address is one of a mobile device phone number, an email address, or a social media account identifier.

7. The medium of claim 2, wherein the URI is generated for a one-time use.

8. The medium of claim 7, wherein the generated URI includes an expiration period.

9. The medium of claim 1, wherein the remote computing device is a mobile computing device.

10. The non-transitory computer storage media of claim 1, wherein the remote server device obtains the biometric signature from the remote computing device without further communication of the digital document.

11. A computerized system comprising:
    one or more processors; and
    one or more computer storage media storing computer-usable instructions that, when used by the one or more processors, cause the one or more processors to:
    receive, via a displayed graphical user interface (GUI), an instruction to obtain a biometric signature from a remote computing device for association with a signature field of a displayed digital document, the received instruction including an electronic contact address associated with the remote computing device;
    send a remote signing request associated with the signature field of the displayed digital document to a remote server device, the sent remote signing request causing the remote server device to send, to the electronic contact address, a generated URI that immediately presents at least one option to receive the biometric signature when accessed; and
    place the biometric signature into a position that corresponds to the signature field of the digital document based on a receipt of the biometric signature from the remote server device.

12. The system of claim 11, wherein the electronic contact address is one of a mobile device phone number, an email address, or a social media account identifier.

13. The system of claim 11, wherein a notice to respond with the biometric signature is sent to the electronic contact address with the generated URI.

14. The system of claim 13,
    wherein the sent remote signing request further causes the remote server device to receive, from the remote computing device via the electronic contact address, the biometric signature as a file attachment.

15. The system of claim 11 wherein the remote computing device is a mobile computing device.

16. A computer-implemented method to retrieve biometric signatures to electronically sign digital documents, the method comprising:
    receiving, by a server device and from a first remote computing device, a request to retrieve a biometric signature from a second remote computing device for association with a signature field of a digital document stored on the first remote computing device;
    generating, by the server device, a Uniform Resource Identifier (URI) that, when accessed by the second remote computing device, causes presentation of an interface that receives the biometric signature for association with the signature field, the URI being generated for communication to the second remote computing device;

sending, by the server device and to the first remote computing device, the biometric signature received from the second remote computing device via the presented interface.

17. The computer-implemented method of claim 16, wherein the biometric signature is one of a signature vector or a signature file.

18. The computer-implemented method of claim 16, wherein the request includes an electronic contact address associated with the second remote computing device, wherein the URI is communicated to the electronic contact address, and wherein the biometric signature is received from the electronic contact address.

19. The method of claim 16, wherein the URI is generated based on cryptographically-strong and randomly-generated strings.

20. The computer-implemented method of claim 16, wherein the digital document is never communicated to the second remote computing device.

21. A computerized system comprising:
one or more processors; and
one or more computer storage media storing computer-usable instructions that, when used by the one or more processors, cause the one or more processors to:
receive, from a first remote computing device, a request to retrieve a biometric signature from a second remote computing device for association with a signature field of a digital document on the first remote computing device, the request including an electronic contact address associated with the second remote computing device;
initialize, for delivery to the electronic contact address included in the request, an outgoing electronic message including a Uniform Resource Identifier (URI) that references a dynamic application that immediately presents at least one option to receive the biometric signature for association with the signature field when accessed via the URI;
receive the biometric signature via the dynamic application after the URI is accessed or via a incoming electronic message from the electronic contact address as a response to the outgoing electronic message; and
send, to the first remote computing device, the received biometric signature for association with the signature field of the digital document.

22. The system of claim 21,
wherein the URI is generated based on cryptographically-strong and randomly-generated strings.

23. The system of claim 21, wherein the electronic contact address is a mobile device phone number, wherein the outgoing electronic message is one of a SMS message or a MMS message, and wherein the incoming electronic message is a MMS message.

24. The system of claim 23,
wherein a texting service is employed to deliver the outgoing electronic message and receive the incoming electronic message.

25. The system of claim 24, wherein the outgoing electronic message is initialized based on the electronic contact address and the generated URI being provided to the texting service.

26. The system of claim 21, wherein the digital document is never communicated to the second remote computing device.

27. A computer-implemented method to electronically sign remote digital documents, the method comprising:

receiving, by a first computing device, a first electronic message sent from a remote server device to an electronic contact address associated with the first computing device, the first electronic message being received based at least in part on a request, made by a second computing device, to obtain a digital signature for a digital document;
generating, by the first computing device, a second electronic message including a selected signature file for communication to the remote server device, the second electronic message being generated as a response to the received first electronic message;
sending, by the first computing device, the generated second electronic message to the remote server device, the generated second electronic message being sent to cause a relay of the selected signature file by the remote server device to the second computing device for association with the digital document.

28. The computer-implemented method of claim 27, wherein the first electronic message is received without the digital document.

29. A computerized system comprising:
one or more processors; and
one or more computer storage media storing computer-usable instructions that, when used by the one or more processors, cause the one or more processors to:
receive, by a first computing device, a first electronic message sent from a remote server device to an electronic contact address associated with the first computing device, the received first electronic message including a URI that references an interface to receive a biometric signature from the first computing device for a document stored on a second computing device;
provide for display, by the first computing device in response to the URI being accessed, the referenced interface to receive the biometric signature;
communicate, by the first computing device and to the remote server device, the received biometric signature to cause a relay thereof to the second computing device for association with the stored document.

30. The system of claim 29, wherein the first electronic message is sent based on a request sent from the second computing device to the remote server device, the request including the electronic contact address.

31. The system of claim 28, wherein the first electronic message is received without the digital document.

32. A computerized system comprising:
one or more processors; and
one or more computer storage media storing computer-usable instructions that, when used by the one or more processors, cause the one or more processors to:
receive a camera scan corresponding to a QR code displayed by another computing device, the QR code being displayed in conjunction with a digital document having a signature field and stored on the other computing device;
access a URI encoded in the scanned QR code, the URI corresponding to a dynamic application interface, provided by a remote server device, that immediately requests a biometric signature via a touchscreen;
communicate the received biometric signature to the remote server device via the dynamic application interface, wherein the remote server device is configured to relay the received biometric signature to the other computing device and cause the other computing device to associate the received biometric signature with the signature field.

33. The system of claim 32, wherein the QR code is displayed based on a signature request sent from the other computing device to the remote server device.

34. The system of claim 33, wherein the received biometric signature is relayed to the other computing device based on the sent signature request.

35. The system of claim 32, wherein the biometric signature is requested without a communication of the digital document.

* * * * *